United States Patent [19]

Armond et al.

[11] Patent Number: 4,576,614
[45] Date of Patent: Mar. 18, 1986

[54] PROCESS AND APPARATUS FOR SEPARATION OF A GASEOUS MIXTURE

[75] Inventors: John W. Armond, Buckhurst Hill; Kenneth C. Smith, Roydon, both of England

[73] Assignee: The BOC Group, Inc., Murray Hill, N.J.

[21] Appl. No.: 314,949

[22] Filed: Oct. 26, 1981

[30] Foreign Application Priority Data

Oct. 30, 1980 [GB] United Kingdom ............... 8035003

[51] Int. Cl.⁴ .............................................. B01D 53/04
[52] U.S. Cl. ............................................. 55/18; 55/21; 55/31; 55/58; 55/68; 55/75
[58] Field of Search ................. 55/18, 21, 25, 26, 31, 55/33, 58, 62, 68, 74, 75

[56] References Cited

U.S. PATENT DOCUMENTS

| | | | |
|---|---|---|---|
| 3,659,399 | 5/1972 | Kauer, Jr. et al. | 55/33 |
| 3,775,946 | 12/1973 | Brazzel | 55/58 |
| 3,923,477 | 12/1975 | Armond et al. | 55/25 |
| 4,011,065 | 3/1977 | Munzner et al. | 55/25 |
| 4,065,272 | 12/1977 | Armond | 55/25 |
| 4,129,424 | 12/1978 | Armond | 55/25 |
| 4,144,037 | 3/1979 | Armond et al. | 55/58 |
| 4,144,038 | 3/1979 | Armond | 55/58 |
| 4,168,149 | 9/1979 | Armond et al. | 55/21 |
| 4,205,967 | 6/1980 | Sandman et al. | 55/21 |
| 4,315,759 | 2/1982 | Benkmann | 55/58 X |
| 4,323,370 | 4/1982 | Leitgeb | 55/18 |
| 4,331,455 | 5/1982 | Sato | 55/21 |

FOREIGN PATENT DOCUMENTS

| | | |
|---|---|---|
| 2702784 | 7/1978 | Fed. Rep. of Germany . |
| 1364674 | 8/1974 | United Kingdom . |
| 1424501 | 2/1976 | United Kingdom . |
| 1480866 | 7/1977 | United Kingdom . |
| 1541767 | 3/1979 | United Kingdom . |

Primary Examiner—Robert Spitzer
Attorney, Agent, or Firm—David L. Rae; Larry R. Cassett

[57] ABSTRACT

A compressed gas mixture, for example air, is passed through one of beds 12 and 14 of adsorbent that selectively adsorbs oxygen from the air. Unadsorbed nitrogen-enriched gas flows into a buffer vessel 28, from which product gas is withdrawn through pipeline 30. While one of the beds 12 and 14 is adsorbing oxygen for air the other is being regenerated, and during this period the communication between the beds is denied. At the end of a chosen period of time the beds are placed in communication with one another by opening valves 54 and 56. Then the bed that was previously being regenerated is placed in communication with the source of compressed air and the other bed regenerated. The period of intercommunication between the beds lasts for as long as it takes the volume of product gas as measured by an integrating flow meter 31 from the start of the preceding adsorption step to reach a chosen value. The apparatus is able to supply nitrogen of a chosen purity at a variable flow rate.

10 Claims, 4 Drawing Figures

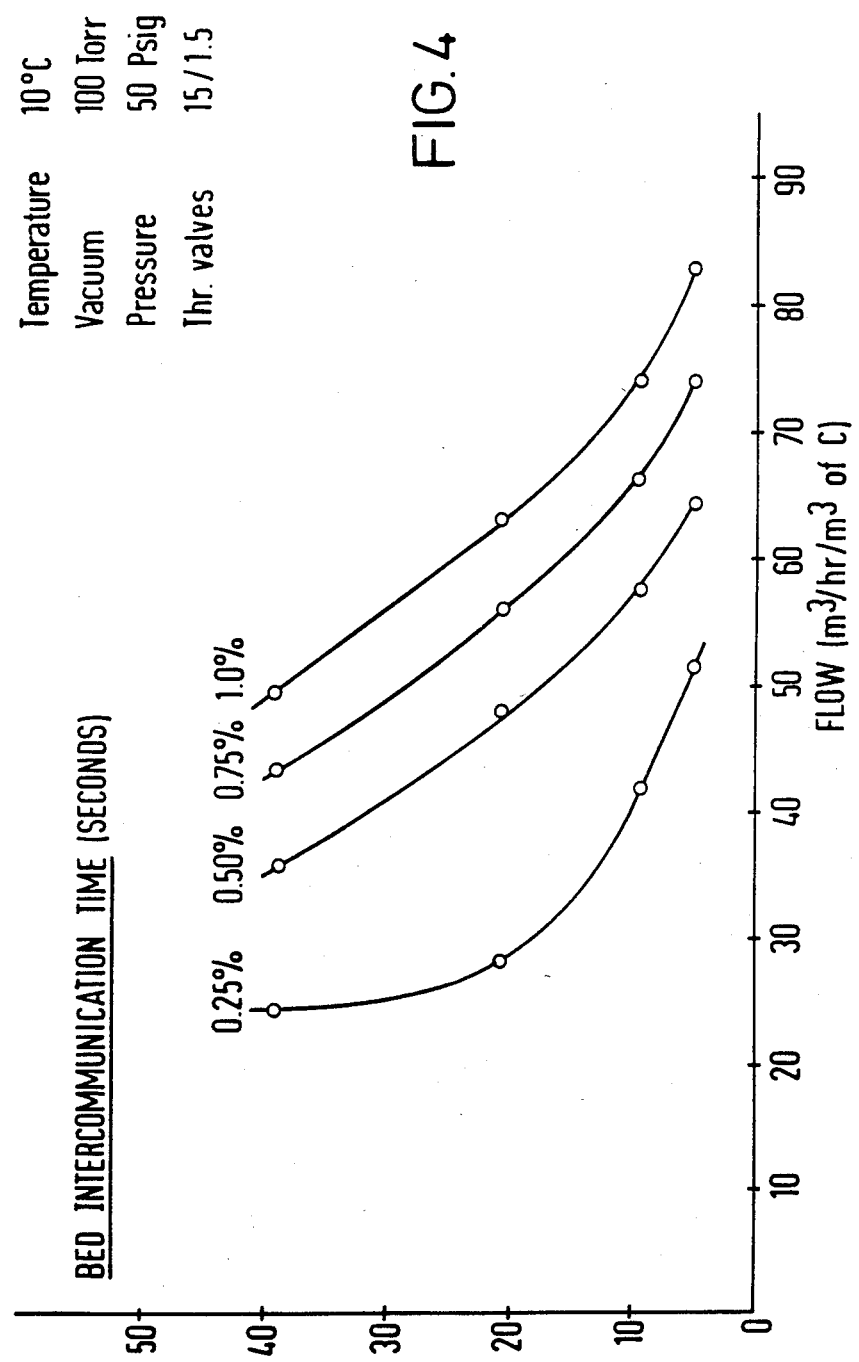

PROCESS AND APPARATUS FOR SEPARATION OF A GASEOUS MIXTURE

FIELD OF THE INVENTION

This invention relates to a process and apparatus for the separation of a gaseous mixture, particularly air.

BACKGROUND OF THE INVENTION

UK patent specifications Nos. 1 480 866 and 1 541 767, and German Offenlegungsschrift No. 2 702 784 all relate to processes for the separation of nitrogen from air employing an adsorbent which has the ability to effect a separation as between the two major components of air by virtue of its more rapid adsorption of oxygen than nitrogen. The adsorbent is typically molecular sieve carbon, for example, as described in UK patent specifications No. 1 364 674 and 1 424 501. In operation, a bed of the adsorbent is put through a cycle of operations which includes an adsorption step during which time air is passed through the bed, most of the oxygen and a proportion of the nitrogen and substantially all the carbon dioxide and water vapour in the feed are adsorbed, and a nitrogen-rich product gas is supplied from the outlet of the bed, and a desorption step during which time the outlet of the bed is closed, the bed is vented to atmospheric pressure through its inlet and or evacuated through its inlet so that the adsorbed gases are substantially removed from the bed thereby preparing it for the next adsorption step.

In practice, two adsorbent beds are employed and operated on similar cycles which are sequenced to be out of phase with one another by 180° so that when one bed is on its adsorption step, the other bed is on its desorption step, and vice versa. Moreover, it is usual to equalise the pressures in the two beds between each step by connecting the two bed inlets together and connecting the two bed outlets together. With these connections made the gas within the void spaces of the bed which has just completed its adsorption step is sucked into the bed which has just completed its desorption step by virtue of the pressure difference which exists between the beds at that stage, and this is found to be beneficial in maximising the product output because the gas in such void spaces will have already become somewhat enriched in nitrogen.

In commercial practice it is likely that the demand for the product gas may vary or, perhaps, an occasion may arise in which the purity of the product gas may need to be varied. It is an aim of the present invention to provide a process and apparatus which is capable of meeting such need.

SUMMARY OF THE INVENTION

According to the invention there is provided a process for the separation of a gaseous mixture comprising the steps of:
 (a) performing a cycle of operations employing a first vessel containing adsorbent which adsorbs one component of the gas mixture more readily than another or the other component of the gas mixture, the cycle of operations comprising:
  (i) passing the gaseous mixture at superatmospheric pressure through the vessel whereby said one component is adsorbed and the gas stream relatively lean in the adsorbed component flows out of the bed;
  (ii) regenerating the adsorbent by desorbing gas therefrom and causing a gas stream relatively rich in the desorbed gas to flow out of the vessel;
 (b) repeatedly performing such a cycle of operations employing a second vessel containing such adsorbent, the cycles being phased relative to one another such that at no time is step (i) or step (ii) in one cycle performed simultaneously with the corresponding step in the other cycle;
 (c) passing one of the gas streams into a reservoir;
 (d) continuously withdrawing gas from the reservoir; wherein each adsorption step lasts a chosen constant period of time, and wherein an adsorption step in one cycle is started after a preceding adsorption step in the other cycle only once the volume of the gas withdrawn from the reservoir, measured from the commencement of the preceding adsorption step, has reached a predetermined value.

The invention also provides apparatus for performing the above-mentioned process, comprising a first vessel able to contain adsorbent which adsorbs one component of the gaseous mixture more readily than another or the other component of the gaseous mixture, a second such vessel, the vessels each having associated therewith an inlet valve for selectively placing it in communication with a source of the gaseous mixture, a first outlet valve for selectively placing it in communication with the atmosphere or a vacuum pump, or both, and a second outlet valve operable to place it selectively in communication with a product reservoir, and an integrating flow meter downstream of the product reservoir, the integrating flow meter being operatively associated with the inlet valves such that one of the vessels is placed selectively in communication with the source of the gaseous mixture only after communication of the other such vessel with the source of the gaseous mixture has been ended and the volume of gas sensed by the integrating flow meter from the start of the period in which the adsorbent in the other vessel was adsorbing said component from the gaseous mixture, has reached a predetermined value.

Preferably, the duration of each adsorption step is the same as the duration of each regeneration step.

Preferably there is a single reservoir.

In intervals between successive adsorption steps the two vessels are preferably placed in flow communication with each other. Gas from the void spaces of the vessel which has just completed its adsorption step is thus sucked into the vessel which has just completed its regeneration step by virtue of the pressure difference which exists between the vessels at that stage. This is found to be beneficial in maximising the product output (when the product is the gas stream relatively lean in the adsorbed component) because the gas in such void spaces will have already become somewhat enriched in the non-adsorbed component or components. It is desirable that the two vessels are placed in flow communication with each other through one or more flow restricting valves. Typically, the vessels are columns and there is a first conduit which connects the tops of the columns and a second conduit which connects the bottoms of the columns. There is typically a flow restricting valve in each column. The presence of such flow restricting valves makes it possible to keep to a minimum damage caused to the adsorbent particles by impact against the walls of the vessels or other adsorbent particles that tends to be caused when the pressure in a vessel is suddenly reduced owing to the consequent high flows of gas causing the particles to move.

We have found that the process and apparatus according to the present invention make it possible to reduce the flow rate at which the product gas stream is taken from the reservoir without affecting its purity. Typically, it may be arranged that the interval between successive adsorption steps is, say, four seconds at the maximum flow rate of the product gas stream. If the demand for the product is reduced, it will take longer to reach the predetermined volume and accordingly there will be a longer interval between ending one adsorption step and starting the next. If it is desired for any reason to vary the purity of the gas stream taken from the reservoir as product, this can be done by altering the predetermined volume. If the predetemined volume is increased the purity of product gas will be decreased, and vice versa.

The gaseous mixture is preferably raised to superatmospheric pressure by being compressed in a compressor, the rate at which power is consumed by the compressor being reduced if the demand for gas from the reservoir is reduced. The power can be saved by providing the compressor with conventional unloading means. Analogously, power can be saved on the operation of any vacuum pump used to assist regeneration of the adsorbent, the vacuum pump being operated with a reduced power consumption during intervals between the end of one regeneration step and the start of the next.

The process and apparatus according to the invention are particularly but not exclusively intended for the separation of air so as to produce a nitrogen-rich product. Typically, adsorbent employed in the process and apparatus is carbon molecular sieve and the gas stream relatively lean in the selectively adsorbed component is the one passed to the product reservoir. With air as the incoming gas, this gas stream will consist essentially of nitrogen.

The process according to the present invention may, if desired, employ more than two vessels of adsorbent.

BRIEF DESCRIPTION OF DRAWINGS

The process and apparatus according to the present invention shall now be described by way of example with reference to the accompanying drawings, in which:

FIG. 4 is a graph showing, for different nitrogen purities, the variation in product flow rate with varying periods of time for which the adsorption vessels are in communication with one another.

DESCRIPTION OF A PREFERRED EMBODIMENT

Figure 1:
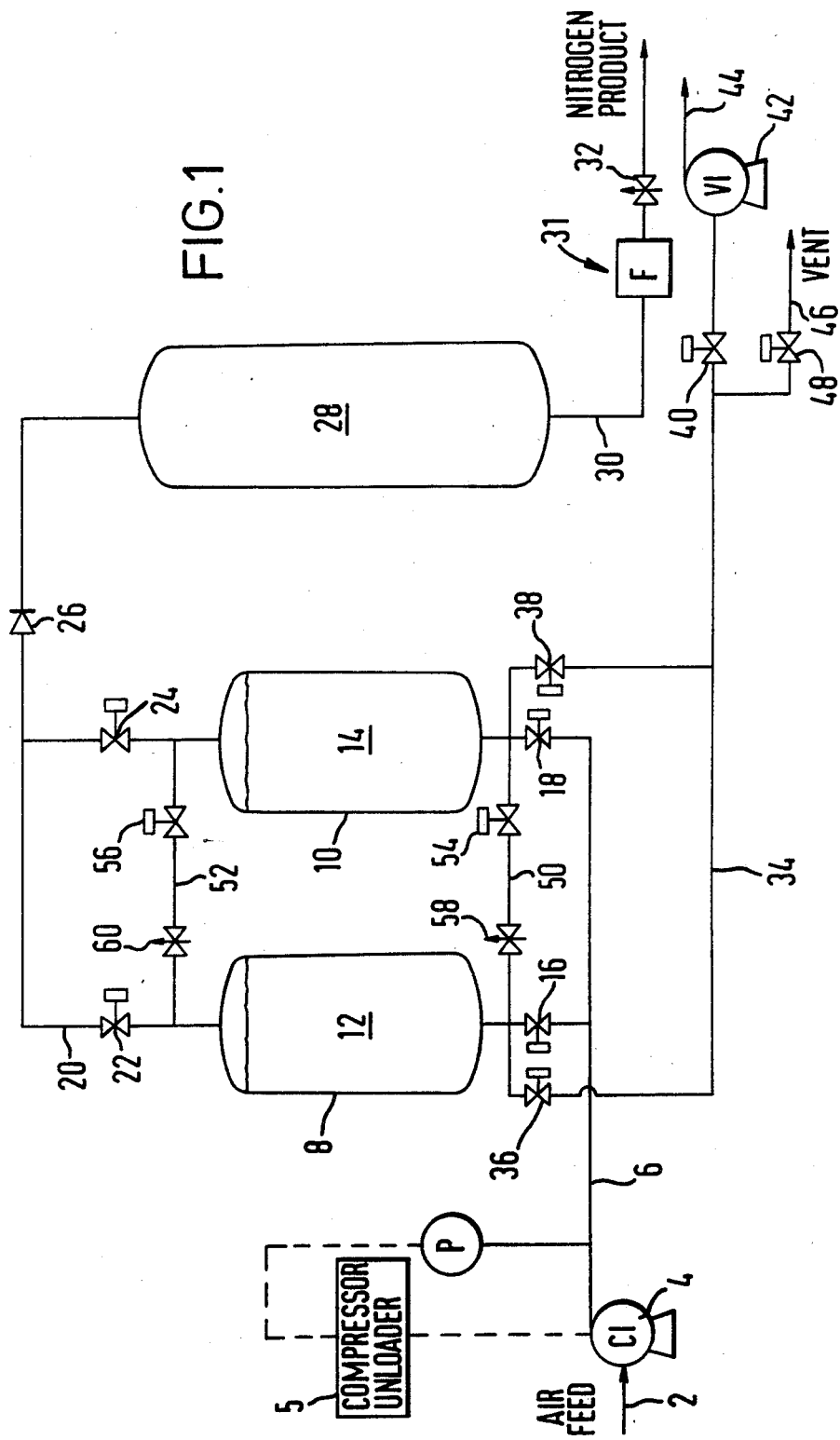
FIG. 1 is a schematic diagram showing plant for separation of nitrogen from air in accordance with the invention.
Figure 3:
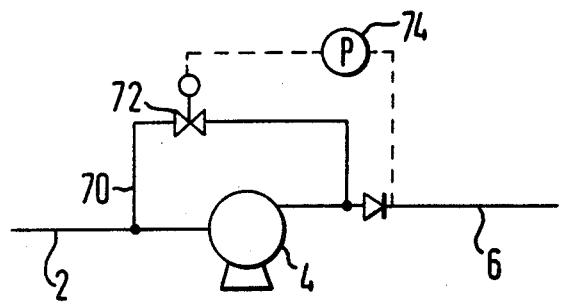
FIG. 3 shows schematically apparatus for unloading the compressor shown in FIG. 1.

Referring to FIG. 1, the illustrated plant includes an air feed pipeline 2 leading to a compressor 4. The compressor 4 has unloading means 5 which will be described below with reference to FIG. 3. The outlet of the compressor 4 communicates with an air inlet pipeline 6. The air inlet pipeline 6 is able to be placed in communication with either one of columns or vessels 8 and 10 containing beds 12 and 14 of carbon molecular sieve adsorbent. Valve 16 is operable to place the bottom of bed 12 in communication with the inlet pipeline 6 or to deny communication between the bed 12 and the inlet pipeline 6. Analogously, valve 18 is operable to place the bottom of the bed 14 in communication with the inlet pipeline 6, or to deny such communication.

The plant shown in FIG. 1 has an outlet pipeline 20. A stop valve 22 is operable to place the top of the bed 12 in communication with the pipeline 20 or to prevent communication between the bed 12 and the pipeline 20. Analogously, a stop valve 24 is operable to place the top of the bed 14 in communication with the pipeline 20 or to deny such communication. The pipeline 20 communicates with a buffer vessel or reservoir 28 (typically of larger volume than either column 12 or column 14 (which are identical to one another)). It is not necessary for the vessel 28 to have a larger volume than the column 12 or 14. In the pipeline 20 is a non-return valve 26 set to be open only when the pressure upstream thereof exceeds the pressure downstream thereof. The buffer vessel 28 has an outlet to a pipeline 30 for product gas. In the pipeline 30 is disposed an integrating flow meter 31 and downstream of the flow meter 31, a flow control valve 32. The plant shown in FIG. 1 has an outlet pipeline 34 for waste gas. A valve 36 is operable to place the bottom of the bed 12 in communication with the pipeline 34, or may be closed to deny such communication. The valve 38 is operable to place the bottom of bed 14 in communication with pipeline 34 or, when closed, deny such communication. The pipeline 34 communicates with a vacuum pump 42. A valve 40 is situated upstream of the pump 42 in the pipeline 34. It is operable to prevent cummunication between the pumps and the inlets to the pipeline 34. The outlet of the vacuum pump 42 communicates with pipeline 44 for discharge of waste gas from the plant. In communication with pipeline 44 upstream of the valve 40 is a vent pipeline 46 communicating with the atmosphere. In the pipeline 46 is a valve 48.

A pipeline 50 connects together the bottoms of the columns 8 and 10. A similar pipeline 52 connects together the tops of the columns 8 and 10. In the pipeline 50 is disposed a stop valve 54, and in the pipeline 52 is disposed a stop valve 56. When the valves 54 and 56 are open there is communication between the beds 12 and 14. No such flow communication is allowed when the valves 54 and 56 are closed. In the pipeline 50 is a flow control valve 58, and in the pipeline 52 is a flow control valve 60.

The valves 16, 18, 22, 24, 36, 38, 40, 48, 54 and 56 are all automatically operated, typically by solenoids or by pneumatic actuators.

The valves 32, 58 and 60 are typically manually operable flow control valves which may be set to give a chosen flow rate of gas therethrough.

The valves 16, 18, 22, 24, 36, 38, 40, 48, 54 and 56 typically each have two positions only, in one of which the valve is closed and in the other of which the valve is open without there being any substantial restriction to the flow of gas therethrough.

The operation of the plant shown in FIG. 1 will now be described with reference to FIG. 2.

Figure 2:
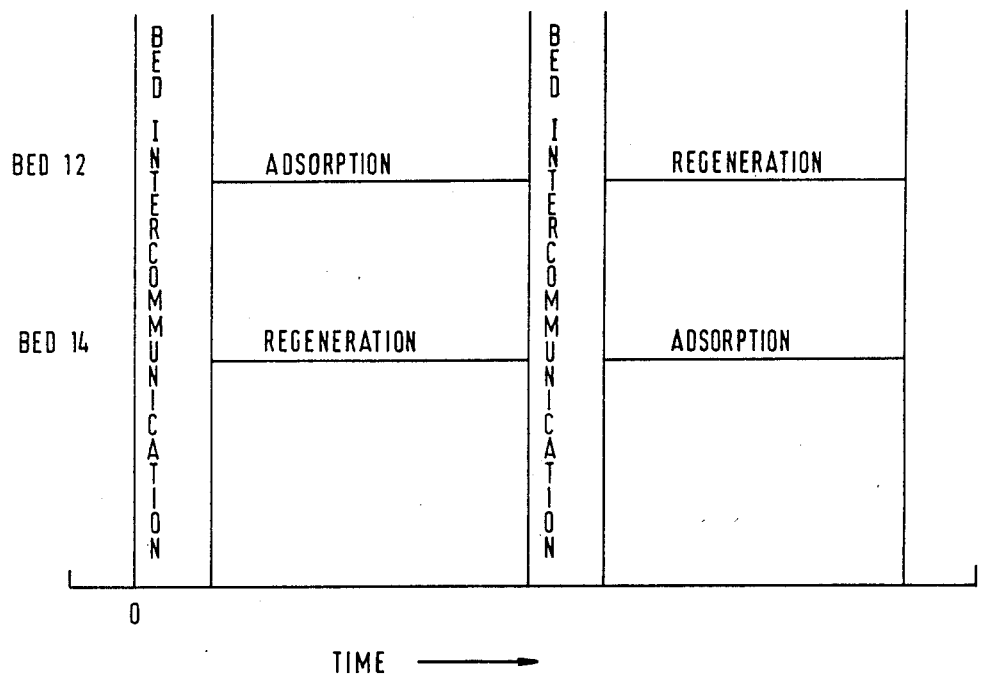
FIG. 2 indicates the sequencing or phasing of the operating cycle of the two adsorbent vessels shown in FIG. 1.

As shown in FIG. 2, a two step cycle is repeatedly performed by each bed. The two steps are called herein "adsorption" and "regeneration". These steps are typically performed at the same temperature as one another.

The adsorption and regeneration steps are all of equal time and phased such that whenever one of the beds is performing an adsorption step the other is being regenerated. Moreover, there is an interval between one pair of adsorption and regeneration steps and the next pair of adsorption and regeneration steps. Throughout this interval the two beds are placed in communication one another by opening the valves 54 and 56. The intervals are of variable time, the valves 54 and 56 being operatively associated with the integrating flow meter 31 in a manner that will be described below.

Initially, as shown in FIG. 2, the beds 12 and 14 are placed in communication with one another through the pipelines 50 and 52. While the beds are thus in communication the valves 16, 18, 22, 24, 36, 38, 40 and 46 are all in their closed positions and valves 54 and 56 are open. Unadsorbed nitrogen-rich gas in the spaces between individual particles of adsorbent in the bed 14 flows through pipelines 50 and 52 into the bed 12. The flow control valves 58 and 60 restrict such flow. These valves are set to as to give equal flow rates therethrough. The setting the valves is such that gravitational forces on the particles of adsorbent at the top of the bed 14 are always at least twice the upward force exerted thereupon by gas passing from the bed 14 to the bed 12. The unadsorbed gas in the bed 14 which passes to bed 12 is rich in nitrogen. As it passes to the bed 12 so the pressure in the bed 12 increases from below atmospheric pressure and the pressure in the bed 14 undergoes a corresponding reduction. By the time the valves 54 and 56 are closed again, the pressure in the bed 14 may typically still be above that in the bed 12.

During the period in which the two beds are in communication with one another, product nitrogen is supplied continuously from the buffer vessel 28. Since during this time no gas flows into the buffer vessel 28 the delivery pressure of the product gas falls, but this fall in pressure need not be severe. When the total volume is sensed by the integrating flow meter 31 from the start of the adsorption period immediately proceeding that in which the two beds are in communication with one another has reached a chosen reference value, the flow meter 31 generates a signal which is transmitted to the valves 54 and 56 and is effective to close them.

Simultaneously with the closing of the valves 54 and 56, the valves 16, 22, 38 and 48 open. This starts the bed 12 on an adsorption step and a bed 14 on a regeneration step. Moreover, the integrating flow meter 31 is automatically zeroed with the opening of the valves 16, 22, 38 and 48. Opening the value 16 enables compressed air to flow from the compressor 4 through the pipeline 6 to the bed 12. Product gas flows out of the bed 12 into the product line 20 (and non-return valve 26 is opened) into the buffer vessel or reservoir 28. In addition, the reduction in pressure caused by opening the valves 38 and 48 causes oxygen previously adsorbed by the bed 14 to be desorbed and to flow out of the column 10 in a direction counter to that of the passage of the incoming air. During the initial stage of the adsorption step the pressure in bed 12 is less than that in the buffer vessel 28 so that no nitrogen can flow into the vessel 28, reverse flow being stopped by the valve 26. Nonetheless, as the adsorption step progresses the adsorbent in the bed 12 is able to adsorb oxygen from the compressed air and thereby produces gas relatively rich in nitrogen. The incoming air will also be enriched by the nitrogen-rich gas which is passed to the bed 12 from the bed 14 during the previous phase of placing the two beds in communication with one another. When the pressure in the bed 12 exceeds that in the buffer vessel 28 the valve 26 opens and nitrogen flows into the buffer vessel 28. The flow control valve 32 is set to ensure that the flow of gas into the buffer vessel 28 is at a greater overall rate than the flow of gas out of such vessel.

At the same time as the bed 12 is adsorbing oxygen from the incoming gas so the bed 14 is being regenerated. When the pressure of the bed 14 has fallen to atmospheric pressure, the valve 48 closes and the valve 40 opens connecting bed 14 to the vacuum pump. Thus, the vessel 14 is subjected to a sub-atmospheric pressure and is hence evacuated.

After a predetermined time has elapsed form the start of the pair of adsorption and regeneration steps described above, the valves 16, 22, 38 and 40 automatically close and the valves 54 and 56 reopen. Typically, each adsorption step (and hence each regeneration step) lasts for 56 seconds.

Opening the valves 54 and 56 repeats the operation of placing the two beds in communication with one another. This operation is ended when the total volume from the start of the proceeding adsorption period sensed by the integrating flow meter 31 amounts to a predetermined reference volume. Typically, the reference volume is chosen such that the valves 54 and 56 stay open for 4 seconds at a time when the demand for nitrogen is at its maximum. If the demand is reduced from this maximum or peak demand, then the flow control valve 32 will be adjusted accordingly and the gas will accordingly be delivered from the buffer vessel 28 at a lower rate. This will have the consequence that it will take a longer time for the volume sensed by the integrating flow meter 31 to reach the chosen reference volume. Hence, the beds 12 and 14 will communicate with one another for a longer period of time. Typically, the valves 54 and 56 will be arranged to be open for a minimum period of 4 seconds a time.

The dependence of the flow rate at a given product purity on the bed intercommunication time is shown in FIG. 4. Assume that it is desired to deliver 50 cubic metres per hour of nitrogen per cubic meter of carbon molecular sieve, and assume that the percentage of oxygen in the product nitrogen is required to be no more than 0.25% by volume. In order to deliver nitrogen at this rate from the reservoir or buffer vessel 28 each bed intercommunication period will amount to about five and a half seconds. If the demand is reduced to say 40 cubic metres per hour, per cubic metre of carbon adsorbent, the integrating flow meter 31 will end the bed intercommunication period 10 seconds after it has started.

It is to be appreciated that these results are obtained when the temperature is 10° C., the vacuum applied to the bed being regenerated is 100 Torr, and the inlet pressure of the gas entering the bed that is adsorbing is 50 psig.

FIG. 4 also illustrates the result of increasing the demand for nitrogen without increasing the reference or predetermined volume with which the integrating flow meter compares the actual sensed volume. Working on the 0.25% oxygen curve, purity will be maintained until the intercommunication period reaches 4 seconds and the product flow rate 54 m³/hr/m³. With the intercommunication time at 4 seconds (which is the minimum by the control system) the plant is capable of supplying product gas at a flow rate greater than 54

$m^3/hr/m^3$ of C, but at a purity tending towards curves of higher oxygen concentration.

When the volume of gas sensed by the integrating flow meter 31 reaches the predetermined value, the second bed intercommunication period shown in FIG. 2 will be ended by the closing of the valves 54 and 56. Simultaneously with the closing of the valves 54 and 56, the valves 18, 24, 36 and 48 open. This leads to the bed 14 performing an adsorption step while the bed 12 is regenerated first by being placed in communication with the atmosphere and then by being subjected at a sub-atmospheric pressure applied by the vacuum pump 42. This phase of the operating cycle is analogous to the previous phase in which the bed 12 adsorbs while the bed 14 was being regenerated. After a predetemined time the valves 18, 24, 36 and 40 close and the valves 54 and 56 open again so that the whole cycle shown in FIG. 2 can be repeated.

Throughout the operation of the plant nitrogen is withdrawn continuously from the buffer vessel or reservoir 28.

Typically, the incoming air is compressed to a chosen pressure in the range 3 to 8 bar. Typically, during desorption or regeneration the bed being regenerated is subjected to a chosen vacuum in the range 0.1 to 0.2 bar.

If desired, the regeneration of each bed may be performed solely by placing it in communication with the atmosphere. Thus, if desired, the valve 40 and pump 42 may be omitted and regeneration effected merely by opening the valve 48.

In the bed intercommunication periods it is preferred to economise on the power consumed by the compressor 3 by means of the unloading device 5. The unloading device is shown in more detail in FIG. 3. It comprises a bypass line 70 having an inlet communicating with the air inlet pipeline 2 and an outlet communicating with the air feed pipeline 6. In the bypass line 70 is a regulator valve 72. The valve 72 is controlled by a sensor 74 which senses the pressure in the pipeline 6. The sensor 74 produces a signal for controlling the opening of the valve 72 such that if the demand for nitrogen is reduced a greater proportion of the air delivered by the compressor is recycled to its inlet and thus the rate of delivery of air to the adsorbing bed is appropriately decreased.

If, as shown, the plant is operated with a vacuum pump to effect the regeneration, such pump is arranged to pass into a power saving method of operation during the bed intercommunication period.

We claim:

1. An improved process for the separation of a gas mixture comprising the steps of:
   (a) repeatedly performing a cycle of operations employing a first vessel containing adsorbent which adsorbs one component of the gas mixture more readily then another or the other component of the gas mixture, the cycle of operations comprising:
      (i) passing the gaseous mixture at super-atmospheric pressure through the vessel whereby said one component is adsorbed and a gas stream relatively lean in the adsorbed component flows out of the bed, this adsorption step of the cycle of operations lasting a chosen constant period of time;
      (ii) regenerating the adsorbent by desorbing gas therefrom and causing a gas stream relatively rich in the desorbed gas to flow out of the vessel;
   (b) repeatedly performing such a cycle of operations employing a second vessel containing said adsorbent, the cycles being phased relative to one another, such that at no time is step (i) or step (ii) in one cycle performed simultaneously with the corresponding steps in the other cycle; and
   (c) passing the gas stream relatively lean in the adsorbed component into a reservoir; the improvement which comprises continously withdrawing the gas from the reservoir, measuring the flow of gas from the reservoir, and controlling the commencement of the adsorption step in one cycle, such that said adsorption step starts after completion of a preceding adsorption step in the other cycle but only upon the volume of gas withdrawn from the reservoir, measured from the commencement of the preceding adsorption step, having reached a predetemined value.

2. A process as claimed in claim 1, in which the said predetermined value is kept constant, whereby the gas withdrawn from the reservoir is of substantially constant purity.

3. A process as claimed in claim 1, in which the said predetermined value is varied from time-to-time so as to vary the purity of the gas withdrawn from the reservoir.

4. A process as claimed in claim 1, in which the predetermined value is measured by an integrating flow meter.

5. A process as claimed in claim 1, in which the gaseous mixture is raised to the super-atmospheric pressure by being compressed in a compressor, the rate at which power is consumed by the compressor being reduced if the demand for gas from the reservoir is reduced.

6. A process as claimed in claim 1, in which a vacuum pump is used to assist desorption of the adsorbed gas, the rate at which power is consumed via the vacuum pump being reduced between the end of any one step of the cycle and the start of the next step.

7. A process as claimed in claim 1 additionally comprising the step of interconnecting the first and second vessels to one another at the end of each said adsorption step for a variable intercommunication time period while terminating the flow of product gas to said reservoir during said intercommunication period with the duration of said intercommunication period being determined by measurement of said predetermined volume of product gas.

8. An improved process for the separation of air, comprising the steps of:
   (a) repeatedly performing a cycle of operation employing a first vessel containing molecular sieve coke which adsorbs oxygen, carbon dioxide and water vapour more readily than nitrogen, the cycle of operations comprising;
      (i) passing air at super-atmospheric pressure through the vessel whereby oxygen, carbon dioxide and water vapour are adsorbed and a gas stream relatively rich in nitrogen flows out of the bed, this adsorption step of the cycle of operations lasting a chosen constant period of time;
      (ii) regenerating the molecular sieve coke by desorbing oxygen, carbon dioxide and water vapour therefrom and causing a gas stream relatively rich in said oxygen, carbon dioxide and water vapour to flow out of the vessel;
   (b) repeatedly performing such a cycle of operations employing a second vessel containing molecular sieve coke, the cycles being phased relative to one another, such that at no time is step (i) or step (ii) in one cycle performed simultaneously with the corresponding step in the other cycle; and (c) passing the nitrogen into at least one reservoir; the impovement comprising continuously withdrawing the nitrogen from the reservoir and measuring its flow rate by means of an integrating flowmeter, controlling the commencement of th adsorption step in one cycle, such that said adsorption step starts after a preceding adsorption step in the other cycle is completed but only upon the nitrogn withdrawn from the reservoir, measured from the commencement of the preceding adsorption step, having reached a predetermined value.

9. A process as claimed in claim 8, in which in intervals between successive adsorption steps the two vessels are placed in flow communication with each other via flow restricting valves.

10. A process as claimed in claim 8 additionally comprising the step of interconnecting the first and second vessels to one another at the end of each said adsorption step for a variable intercommunication period while terminating the flow of nitrogen to said reservoir during said interconnection period with the duration of said intercommunication period being determined by measurement of said predetermined volume of nitrogen.

* * * * *